Aug. 3, 1965   P. H. VALENTYNE   3,198,310
PAN UNSTACKING APPARATUS
Filed April 23, 1962   2 Sheets-Sheet 1
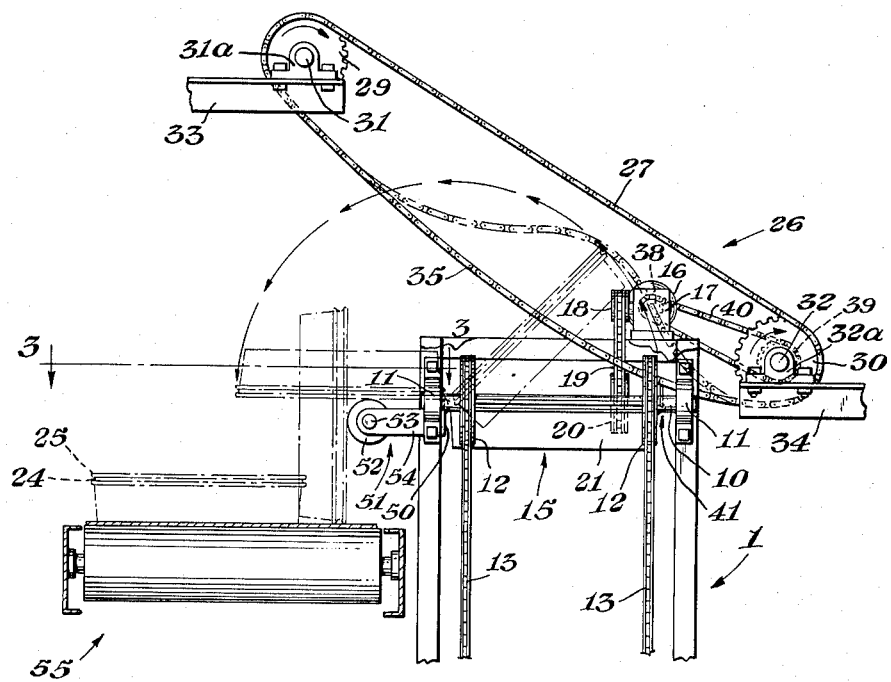
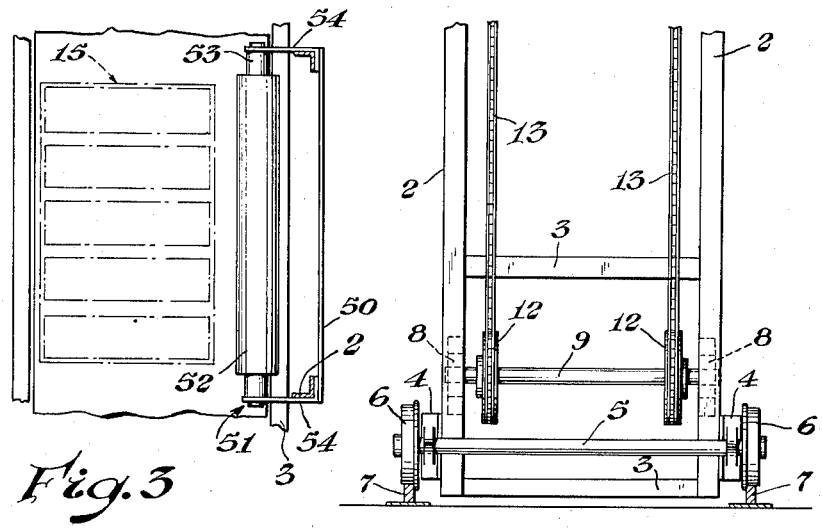
Fig. 3
Fig. 1
INVENTOR.
Peter H. Valentyne
BY
Learman, Learman & McCulloch
ATTORNEYS Aug. 3, 1965     P. H. VALENTYNE     3,198,310
PAN UNSTACKING APPARATUS
Filed April 23, 1962     2 Sheets-Sheet 2
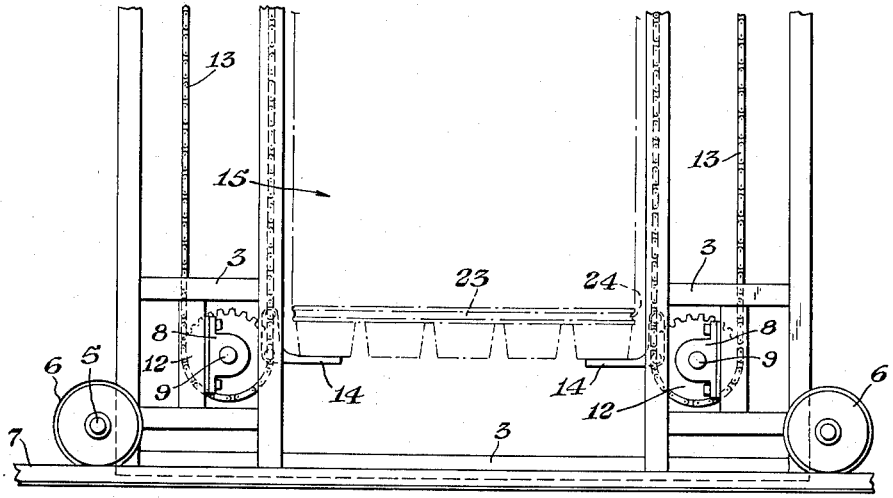
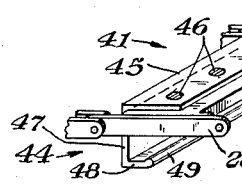
INVENTOR.
Peter H. Valentyne
BY
Learman, Learman & McCulloch
ATTORNEYS

United States Patent Office 3,198,310
Patented Aug. 3, 1965

3,198,310
PAN UNSTACKING APPARATUS
Peter H. Valentyne, Saginaw, Mich., assignor to Baker Perkins Inc., Saginaw, Mich., a corporation of New York
Filed Apr. 23, 1962, Ser. No. 189,507
4 Claims. (Cl. 198—33)

This invention relates to apparatus for unstacking successive pans from a stack of nested pans.

In the operation of commercial bakeries the pans in which dough is contained during a baking cycle customarily are so configured as to enable them to be stacked in nested relation when the pans are not in use. When it is desired to make use of the pans they must be unstacked so that dough pieces may be deposited in each pan. Relatively complex mechanisms have been proposed heretofore for automatically unstacking pans and designers have sought to provide simplified automatic systems for some operations which can be less intricate and expensive. One of the principal factor which has complicated the design of such systems has been the prevailing concept that the uppermost pan of a stack of nested pans must be moved through a vertical distance corresponding substantially to the depth of the pan, prior to moving the uppermost pan laterally so that the bottom of the pan can clear the top of the next lower pan. Consequently, any automatic unstacking device designed with this concept in mind has had to be capable of partaking of sequential vertical and lateral movements.

According to the present invention, sequential lifting and lateral movements of a pan unstacking mechanism are not required. Instead, the uppermost pan of a stack of nested pans is gripped at one side and lifted to rock the pan about its opposite side, thereby upsetting or overturning the pan to remove it from the stack. When the pan is rocked to a position where it has the tendency to continue to rock in the same direction under the influence of gravity, the pan is released so as to enable it to fall to an overturned position and an abutment may be positioned in the path of movement of the falling pan so as to engage and flip the latter through 180° to restore the pan to its upright position. In the apparatus and method of the present invention, therefore, a substantial portion of the work of unstacking a stack of pans is accomplished by gravity, thereby dispensing with the necessity for complex and expensive pan control mechanisms.

An object of this invention is to provide improved apparatus for unstacking a stack of nested pans.

Another object of the invention is to provide simplified and relatively inexpensive apparatus operable automatically to unstack pans from a stack of pans.

A further object of the invention is to provide pan unstacking apparatus that is adapted for use with currently available pan stack elevating mechanisms so as to be interchangeable with previously known unstacking devices.

Another object of the invention is to provide simplified apparatus that is capable of acting on an inverted pan and flipping it through 180° so as to turn the pan to an upright position.

A further object of the invention is to provide apparatus of the kind referred to which enables a substantial portion of the unstacking operation to be accomplished by gravity.

Other objects and advantages of the invention will be pointed out specifically or will become apparent from the following description when it is considered in conjunction with the appended claims and the accompanying drawings, in which:

FIGURE 1 is a fragmentary, elevational view of a pan stack elevator mechanism and unstacking apparatus, the unstacking apparatus being shown in the act of beginning an unstacking operation to deliver a pan to a moving conveyor and the moving conveyor being shown in section;

FIG. 2 is a fragmentary, side elevational view of the elevator mechanism and of the unstacking mechanism;

FIG. 3 is a view partly in top plan and partly in section of a portion of the apparatus shown in FIGURE 1, the section being taken on the line 3—3 of FIGURE 1; and FIG. 4 is a perspective view of a pan engaging and lifting member forming part of the unstacking mechanism.

Apparatus constructed in accordance with the invention is adapted for use in conjunction with a known pan stack elevator mechanism indicated generally by the reference character 1 and comprising a number of vertically arranged frame members 2 that are connected one to another by cross bars 3 to form a rigid, substantially rectangular frame. Preferably, the lower end of the frame is provided with journal blocks 4 in which are journaled shafts 5 having wheels 6 mounted at opposite ends thereof and adapted to ride on rails 7, whereby the apparatus 1 is mobile. Journal blocks 8 are supported on selected frame members at the lower part of the apparatus 1 and rotatably journal a pair of parallel shafts 9. A similar pair of parallel shafts 10 are journaled in blocks 11 that are supported at the upper end of the frame of the apparatus 1. Each of the shafts 9 and 10 has fixed thereto a pair of sprocket wheels 12 and around each upper and lower sprocket wheel is trained an endless sprocket chain 13. On each chain 13 is fixed a pair of laterally extending lugs 14. The lugs 14 are so arranged that they may support a stack of pans 15 and elevate the stack as successive pans are removed from the top of the stack so as to maintain the uppermost pan at a desired level.

Means for driving the elevator chains may comprise an electric motor 16 supported on the elevator frame and connected through a reduction gear box 17 or the like so as to rotate a sprocket pinion 18 around which a chain 19 is trained, the chain 19 also being trained around a sprocket 20 mounted on one of the upper shafts 10. Rotation of the one shaft 10 may be transmitted to the other shaft 10 by means of a sprocket and chain arrangement of conventional construction so as to effect simultaneous movement of the several elevator lugs in the same direction and at the same speed.

As is best shown in FIGURES 1 and 2, the pans 15 have downwardly diverging side and end walls 21 and 22, respectively, to enable them to be stacked in nested relation. As also is shown in FIGURE 2, a number of pans are joined one to another to form a pan set, the pans of a set being joined to one another by means of a strap 23 extending around the perimeter of the pan set and being grooved as at 24 to form a laterally projecting lip 25 at the upper end of each pan. Although the drawings disclose the pans as being grouped in sets, the invention is applicable to pan sets or individual pans. Consequently, the term "pans" as used herein is intended to apply to individual pans and to pans arranged in sets or groups.

Unstacking apparatus constructed in accordance with the invention is designated generally by the reference character 26 and comprises a pair of endless roller chains 27 and 28 which are trained around pairs of sprocket wheels 29 and 30 that are fixed on shafts 31 and 32, respectively, which are journaled in bearing supports 31a, 32a that are fixed to supporting frame members 33 and 34, respectively. The shaft 31 is supported at a higher level than the shaft 32 so that the chains are inclined obliquely upwardly and transversely of the pan stack.

The dependant loop formed by each chain 27 and 28 is greater in length than the distance between the pairs of sprocket wheels 29 and 30 so that the chain will be slack or limber when it is mounted on the sprockets.

The sprocket 30 is the driving sprocket and is driven in the direction of the arrow shown in FIGURE 1 so that the lower run 35 of each chain will be the slack run. The chains of the unstacking mechanism may be driven by any one of a number of driving means. For example, the armature shaft of the motor 16 may be connected through a gear reduction unit 36 to a shaft 37 on which is mounted a sprocket wheel 38, and the shaft 32 may be extended to support a sprocket wheel 39. A chain 40 may be trained around the sprocket wheels 38 and 39 so as to effect driving of the chains 27 and 28 in timed relation to the driving of the elevator mechanism 1. Alternatively, the mechanisms 1 and 26 may be provided with independent driving motors which may operate their respective mechanisms either continuously or in indexing movements.

The pan unstacking mechanism 26 includes at least one pan engaging and lifting device 41 and is best illustrated in FIGURES 2 and 4. The device 41 comprises a mounting member 42 that spans the chains 27 and 28 and is secured to individual links of the chains by the chain pivot members passing through attaching ears 43 provided at the ends of the member 42. Supported on the mounting member 42 is a lifting member 44 that is generally channel-shaped and has a first flange 45 that overlies the member 42 and is secured to the latter by suitable means such as screws 46. The member 44 includes a web section 47 which terminates in a flange or tongue 48, the free end of the latter being rounded as at 49 so as to be received nicely in the groove 24 of a pan below the lip 25.

In the operation of the apparatus thus far described, a stack of nested pans will be supported on the elevator lugs 14 and the stack elevated so that the upper edge of the uppermost pan in the stack is located at a predetermined level. The level to which the stack of pans is elevated is determined by the position of the tongue 48 of the pan engaging member 44 at the time the tongue 48 engages one side of the upper pan. That is, the uppermost pan of a stack must be at such a level that the tongue 48 will engage the pan below the lip 25 and be received in the groove 24.

As is shown in FIGURE 1, the chains 27 and 28 of the unstacking mechanism are so arranged that driving of them will cause the pan engaging device 41 to move in an upwardly inclined path transversely of the stack of pans. Consequently, upon engagement of the tongue 48 in the groove 24, continued driving of the mechanism 26 will cause the engaged end of the pan to be lifted and rocked about its opposite end. As the pan rocks it displaces the lower run of each chain upwardly, as is indicated in chain lines in FIGURE 1, and the displacement of the lower run of each chain is permitted because of the limberness or slackness of the lower run. In order to avoid any possibility of skidding of the pan being rocked, an upstanding barrier plate 50 may be supported on the frame members 2 in such position as to engage the rocking pan at the end about which it is being rocked.

As the unstacking mechanism continues to be driven, the uppermost pan will be rocked through an arc such as to cause it to move to and beyond a vertical position, whereupon the pan engaging device 41 releases the pan and the latter continues to rock, but under the force of gravity, to an upset or overturned position, as is indicated in FIGURE 1.

After the uppermost pan has been removed from the stack in the manner described above, further operation of the driving means for the elevator and the unstacking mechanisms will reposition the parts for similar operations on the next and succeeding pans in the stack.

It usually is desirable to unstack pans in such manner that they will be in an upright position so as to be capable of receiving dough pieces. Since the unstacking apparatus upsets the pans during the unstacking operations, means designated by the reference character 51 is provided to flip the pans through 180° and restore them to their upright position. The flipping means comprises an abutment member 52 mounted in the path of movement of the pans so as to be engaged by the latter as they are unstacked. The abutment preferably comprises a roller having a central shaft 53 that is rotatably journaled in bearing supports 54 that are fixed to selected frame members 2. As has been indicated earlier, it is preferable that the flipping operation be accomplished by utilization of the force of gravity. This objective may be realized by supporting the abutment roller 52 in such position that it is offset from the center line of a pan toward one side so that the weight of the pan will be unbalanced. By unbalancing the weight of the pan, the latter will rock about the axis of the roller 52 to a substantially vertical position. Preferably, a power driven receiving conveyor 55 of conventional construction is supported in such position as to engage the lower end of the pan when it is in its substantially vertical position. Since the sides of the pan taper, the pan cannot remain in its substantially vertical position but will fall in the direction of the taper of the sides so as to assume an upright position on the conveyor 55.

The disclosed apparatus is presently preferred, but the disclosure is intended to be illustrative rather than definitive of the invention. The invention is defined in the claims.

I claim:

1. Apparatus for upsetting a pan or the like having a projection extending from at least one side thereof, said apparatus comprising means for supporting said pan with said projection at a predetermined level; barrier means on said supporting means engageable with the opposite side of said pan; a pair of turning members spaced apart from one another a distance to more than span said supporting means; means mounting said turning members at different levels above said supporting means and on opposite sides thereof, the lower one of said turning members being at the side of said supporting means corresponding to said one side of said pan; endless, flexible means trained around said turning members and forming upper and lower runs inclined upwardly and transversely of said supporting means, said lower run being unengaged between said turning members and the spacing between said turning members being less than the length of said lower run whereby the latter is slack; hook-shaped means carried by said endless means for movement therewith; and means for driving said endless means in such direction that said hook-shaped means traverses the lower run of said endless means in a direction from said one side of said supporting means toward the other, whereby said hook-shaped means may engage said projection from beneath the latter to lift said pan and rock the latter through an arc of more than 90° about said barrier means and upset said pan, whereupon said hook-shaped means releases said projection and gravity acts on said pan to continue rocking movement thereof, the slackness of said lower run of said endless means being at least as great as that required to permit such rocking of said pan.

2. The apparatus set forth in claim 1 including abutment means supported in the path of rocking movement of said pan following release of the latter by said hook-shaped means, said abutment means being operable to overturn said pan.

3. The apparatus set forth in claim 2 wherein said abutment means comprises a member so positioned as to engage said pan closer to one of its sides than to its opposite side.

4. The apparatus set forth in claim 3 including conveyor means supported beneath said abutment means to receive said pan following overturning of the latter.

(References on following page)

References Cited by the Examiner

UNITED STATES PATENTS

| | | | |
|---|---|---|---|
| 807,016 | 12/05 | Burns | 214—308 X |
| 1,474,793 | 11/23 | Scott | 221—253 X |
| 1,907,456 | 5/33 | Stevenson | 214—306 |
| 2,338,048 | 12/43 | Minaker et al. | 221—209 |
| 2,673,652 | 3/54 | Steadman | 214—308 |
| 2,713,430 | 7/55 | Verrinder | 214—306 |
| 2,804,982 | 9/57 | Verrinder | 214—306 |
| 2,848,138 | 8/58 | Caswell et al. | 221—225 X |
| 2,883,078 | 4/59 | Belk et al. | 214—306 |
| 3,058,614 | 10/62 | Marasso | 221—218 X |

RAPHAEL M. LUPO, *Primary Examiner*.

KENNETH N. LEIMER, *Examiner*.